United States Patent
Zhang

(10) Patent No.: US 8,843,950 B2
(45) Date of Patent: Sep. 23, 2014

(54) TELEVISION AND METHOD FOR SWITCHING TELEVISION PROGRAMS

(71) Applicants: Fu Tai Hua Industry (Shenzhen) Co., Ltd., Shenzhen (CN); Hon Hai Precision Industry Co., Ltd., New Taipei (TW)

(72) Inventor: Pan Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/968,438

(22) Filed: Aug. 16, 2013

(65) Prior Publication Data

US 2013/0332947 A1    Dec. 12, 2013

(30) Foreign Application Priority Data

May 13, 2013  (CN) .......................... 2013 1 01736107

(51) Int. Cl.
*H04H 60/33* (2008.01)
*H04N 21/442* (2011.01)

(52) U.S. Cl.
CPC .............................. *H04N 21/44218* (2013.01)
USPC .................................. 725/12; 725/10; 725/11

(58) Field of Classification Search
USPC ...................................................... 725/10–14
See application file for complete search history.

(56) References Cited

U.S. PATENT DOCUMENTS

| 7,134,130 B1 * | 11/2006 | Thomas ........................... 725/25 |
| 2011/0154385 A1 * | 6/2011 | Price et al. ...................... 725/12 |
| 2014/0068645 A1 * | 3/2014 | Badros et al. ................... 725/12 |

* cited by examiner

*Primary Examiner* — Jason J Chung
*Assistant Examiner* — Sumaiya A Chowdhury
(74) *Attorney, Agent, or Firm* — Novak Druce Connolly Bove + Quigg LLP

(57) ABSTRACT

A television includes an image capturing unit to capture images in front of the television. Faces in the captured images are recognized to generate a face recognition result. When a condition for switching television programs is determined to be met according to the face recognition result, one or more program tables are searched to find a currently aired television program that is suitable for the current audience. The television is switched to a channel playing the found television program.

6 Claims, 3 Drawing Sheets

TELEVISION AND METHOD FOR SWITCHING TELEVISION PROGRAMS

BACKGROUND

1. Technical Field

The present disclosure relates to televisions, and particularly, to a television with a function of switching television programs and a related method.

2. Description of Related Art

A remote control is usually used to switch television programs of a television. However, televisions in public places, such as a waiting hall, cannot be operated by an audience to select a preferred television program, therefore, the programs currently on those television might be less attractive to certain audience.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure are described, with reference to the accompanying drawings.

Figure 1:
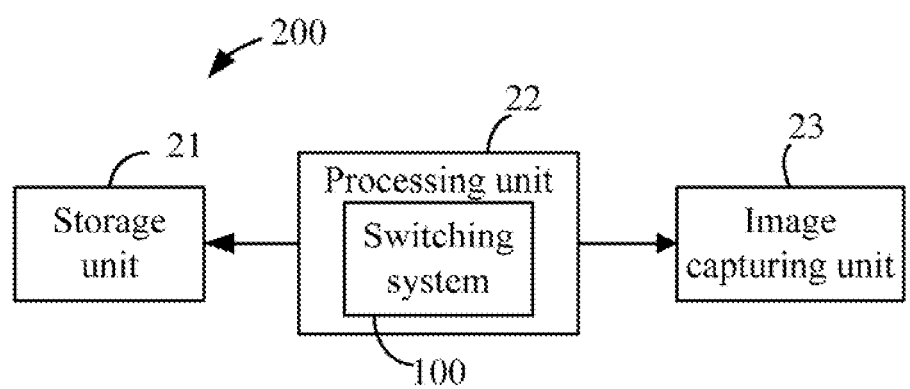
FIG. 1 is a block diagram of a television for switching television programs, in accordance with an exemplary embodiment.
Figure 2:
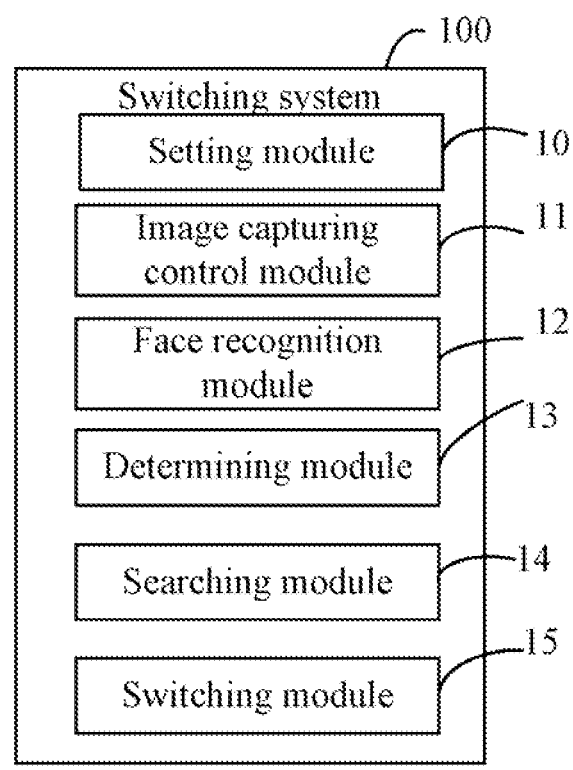
FIG. 2 is a block diagram of a switching system of the television of FIG. 1, in accordance with an exemplary embodiment.

FIGS. 1 and 2 show an embodiment of a television 200 for switching television programs. The television 200 includes a storage unit 21, a processing unit 22, and an image capturing unit 23. The image capturing unit 23 is a camera arranged on a top of the television 200 to capture images in front of the television 200. The storage unit 21 stores a program table and various modules of a switching system 100. The switching system 100 includes a setting module 10, an image capturing control module 11, a face recognition module 12, a determining module 13, a searching module 14, and a switching module 15, which are collection of software instructions and executed by the processing unit 22 to perform functions of the switching system 100.

The setting module 10 classifies television programs of the program table into different types, such as sports programs and news programs, for example. The setting module 10 further classifies audiences according to the number of people, the ratio of men to women, and an average watching time. The average watching time is divided into three time duration. The first time duration is watching 0~15 minutes, the second time duration is 15~30 minutes, and the third time duration is more than 30 minutes.

The setting module 10 further defines relationships between different types of audiences and different types of television programs. Each type of audience corresponds to one type of television program. For example, an audience having a large number of people corresponds to a news program, an audience having more men than women corresponds to a sports program, and an audience having more women than men corresponds to an entertainment program. An audience having an average watching time within the first time duration corresponds to a television program having a short program duration, an audience having an average watching time within the second time duration corresponds to a television program having a medium program duration, and an audience having an average watching time within the third time duration corresponds to a television program having a long program duration.

The image capturing control module 11 directs the image capturing unit 23 to capture an image at every preset time interval.

The face recognition module 12 recognizes faces in the captured images to generate a face recognition result. The face recognition result includes the number of audience members, the number of females in the audience, the number of males in the audience, and an average watching time of the audience. A detailed method for computing the average watching time of the audience is described as following: computing a watching time of each person in the audience according to the preset time interval for capturing two adjacent images; and computing the average watching time according to the watching time of each person in the audience.

The determining module 13 determines whether or not a condition for switching television programs is met according to the face recognition result. When a change of the number of audience members is equal to or greater than a first preset value, such as from two people to ten people, the determining module 13 determines that a first condition for switching television programs is met. When a change of a ratio of male-female audience members is equal to or greater than a second preset value, the determining module 13 determines that a second condition for switching television programs is met. When the average watching time of the audience members changes from one average watching time within a time duration to another average watching time within another time duration, the determining module 13 determines that a third condition for switching television programs is met.

When one condition for switching television programs is met, the searching module 14 searches within the program table to find a currently aired television program that is suitable for the current audience according to the defined relationships. In this embodiment, a priority level of the first condition is lower than the second condition but higher than the third condition. That is, when the first condition, the second condition, and the third condition are simultaneously met, the searching module 14 chooses a television program that is suitable for the current audience according to the second condition.

The switching module 15 automatically switches the channel of the television 200 to a channel playing the found television program.

Figure 3:
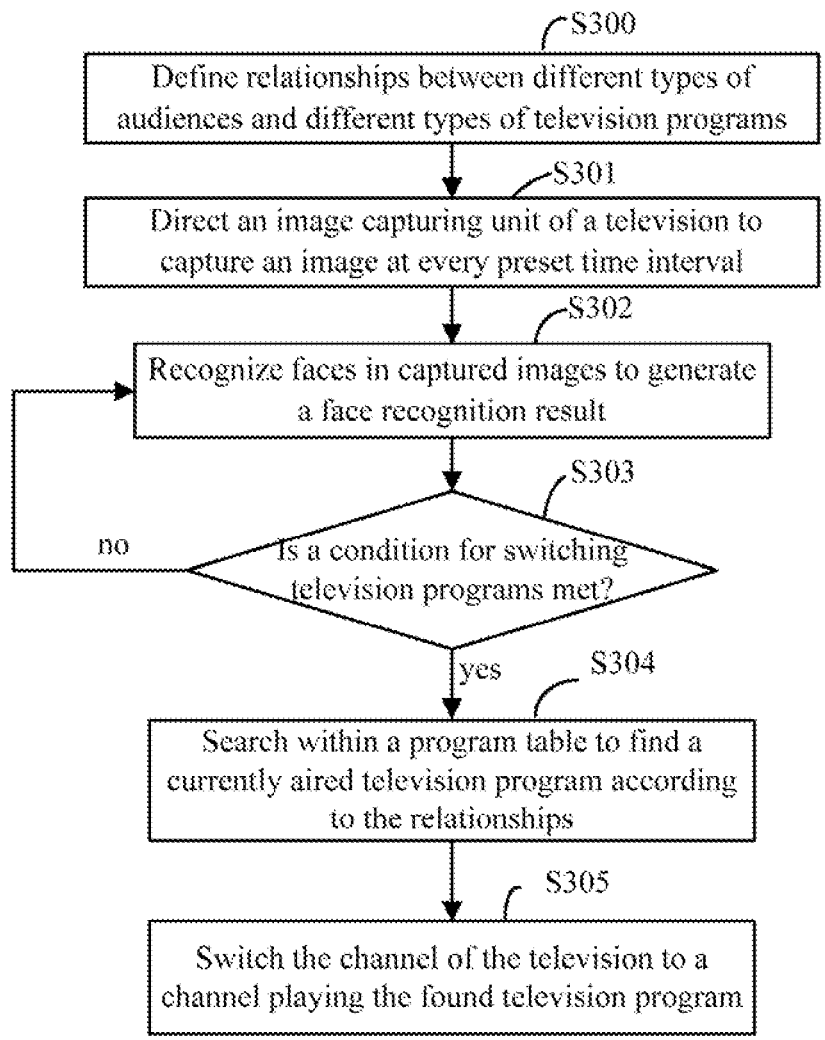
FIG. 3 is a flowchart of a method for switching television programs, in accordance with an exemplary embodiment.

FIG. 3 is a flowchart of a method for switching television programs, in accordance with an exemplary embodiment.

In step S300, the setting module 10 classifies television programs of the program table into different types, classifies audiences into different types, and defines relationships between different types of audiences and different types of television programs.

In step S301, the image capturing control module 11 directs the image capturing unit 23 to capture an image at every preset time interval.

In step S302, the face recognition module 12 recognizes faces in the captured images to generate a face recognition result.

In step S303, the determining module 13 determines whether a condition for switching television programs is met according to the face recognition result. If one condition for switching television programs is met, the procedure goes to step S304. Otherwise, the procedure returns to step S302.

In step S304, the searching module 14 searches within the program table to find a currently aired television program that is suitable for the current audience according to the defined relationships.

In step S305, the switching module 15 switches the channel of the television 200 to a channel playing the found television program.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A television for switching television programs comprising:
    an image capturing unit;
        a storage unit storing a program table and a plurality of modules of a switching system; and
        a processing unit to execute the plurality of modules of the switching system to perform operations for switching television programs, wherein, the operations comprising:
        directing the image capturing unit to capture an image of an audience of the television at every preset time interval;
        recognizing faces in the captured images to generate a face recognition result;
        determining whether a condition for switching television programs is met according to the face recognition result;
        searching within the program table to find a currently aired television program that is suitable for the current audience when a condition for switching television programs is met; and
        switching the channel of the television to a channel playing the found television program, wherein the condition for switching television programs is selected from one of the following when a change of the number of audience members is equal to or greater than a preset value, when a change of a ratio of male-female audience members is equal to or greater than a preset value, or when an average watching time of the audience changes from one average watching time within a time duration to another average watching time within another time duration.

2. The television as described in claim 1, wherein the operations further comprising:
    classifying television programs of the program table into different types, classifying audiences into different types, and defining relationships between different types of audiences and different types of television programs, wherein, each type of audience corresponds to one type of television programs, searching within the program table to find a currently aired television program that is suitable for the current audience is determined according to the relationships.

3. A computer-implemented method for switching television programs applied in a television, the television comprising an image capturing unit to capture images in front of the television, and a storage unit storing a program table, the method comprising:
    directing the image capturing unit to capture an image of an audience at every preset time interval
    recognizing faces in the captured images to generate a face recognition result;
    determining whether a condition for switching television programs is met according to the face recognition result;
    searching within the program table to find a currently aired television program that is suitable for the current audience when the condition for switching television programs is met; and
    switching the channel of the television to a channel playing the found television program, wherein the condition for switching television programs is selected from one of the following when a change of the number of audience members is equal to or greater than a preset value, when a change of a ratio of male-female audience members is equal to or greater than a preset value, or when an average watching time of the audience changes from one average watching time within a time duration to another average watching time within another time duration.

4. The method as described in claim 3, further comprising:
    classifying television programs of the program table into different types, classifying audiences into different types, and defining relationships between different types of audiences and different types of television programs, wherein, each type of audience corresponds to one type of television programs, searching within the program table to find a currently aired television program that is suitable for the current audience is determined according to the relationships.

5. A non-transitory computer-readable storage medium encoded with a computer program, the program comprising instructions that when executed by a television to cause the television to perform operations for switching television programs, the television comprising an image capturing unit to capture images in front of the television, and a storage unit storing a program table, the operations comprising:
    directing the image capturing unit to capture an image of an audience at every preset time interval;
    recognizing faces in the captured images to generate a face recognition result;
    determining whether a condition for switching television programs is met according to the face recognition result;
    searching within the program table to find a currently aired television program that is suitable for the current audience when the condition for switching television programs is met; and
    switching the channel of the television to a channel playing the found television program, wherein the condition for switching television programs is selected from one of the following when a change of the number of audience members is equal to or greater than a preset value, when a change of a ratio of male-female audience members is equal to or greater than a preset value, or when an average watching time of the audience changes from one average watching time within a time duration to another average watching time within another time duration.

6. The storage medium as described in claim 5, wherein the operations further comprising: classifying television programs of the program table into different types, classifying audiences into different types, and defining relationships between different types of audiences and different types of television programs, wherein, each type of audience corresponds to one type of television programs, searching within the program table to find a currently aired television program that is suitable for the current audience is determined according to the relationships.

* * * * *